[11] 3,622,366

[72] Inventor Loyd W. Piester
 New Martinsville, W. Va.
[21] Appl. No. 848,097
[22] Filed Aug. 6, 1969
[45] Patented Nov. 23, 1971
[73] Assignee PPG Industries, Inc.
 Pittsburgh, Pa.

[54] ENCAPSULATION METHOD
 14 Claims, No Drawings
[52] U.S. Cl................................................... 117/16,
 117/66, 117/100 B, 117/100 A, 117/100 C,
 117/100 S, 117/118, 252/89, 252/95, 260/502 R
[51] Int. Cl.................................................C07c 51/50,
 B44d 5/12
[50] Field of Search........................................... 117/100,
 118; 260/502 R; 252/89, 95; 117/66, 16

[56] References Cited
UNITED STATES PATENTS

| | | | |
|---|---|---|---|
| 3,202,535 | 8/1965 | Sachsel et al. | 117/100 X |
| 3,202,731 | 8/1965 | Grevenstuk et al. | 117/100 X |
| 2,287,064 | 6/1942 | Reichert et al. | 260/502 X |
| 2,347,434 | 4/1944 | Reichert et al. | 260/502 X |
| 2,423,451 | 7/1947 | Holuba | 117/100 X |
| 2,448,252 | 8/1948 | Cornthwaite | 260/502 |
| 3,036,338 | 5/1962 | Nack | 117/100 X |
| 3,152,005 | 10/1964 | Tuttle | 117/100 X |
| 3,154,494 | 10/1964 | Speak et al. | 252/85 X |
| 3,231,605 | 1/1966 | Blumbergs | 260/502 |
| 3,241,246 | 3/1966 | Pollock | 117/100 X |
| 3,494,786 | 2/1970 | Nielsen | 117/100 X |
| 3,494,787 | 2/1970 | Lund et al. | 117/100 |

FOREIGN PATENTS

| | | | |
|---|---|---|---|
| 560,389 | 9/1957 | Belgium | 117/100 |

*Primary Examiner*—William D. Martin
*Assistant Examiner*—Mathew R. P. Perrone, Jr.
*Attorney*—Chisholm and Spencer ABSTRACT: Encapsulation is effected by freezing an aqueous composition of the material to be encapsulated and thereafter contacting frozen particles with a hydratable salt. The frozen particles are sized prior to contact with the hydratable salt. Water provided from the frozen particles and hydratable salt are reacted to form the encapsulating coating of hydrated salt.

ENCAPSULATION METHOD

BACKGROUND OF THE INVENTION

Application Ser. No. 602,558 filed Dec. 19, 1966 now issued as U.S. Pat. No. 3,494,787, granted Feb. 10, 1970 assigned to the assignee of this application describes dry particulate compositions of perphthalic, acid particles encased in a protective shell of hydrated salt. Such encapsulated products possess a high degree of stability, particularly when admixed with alkaline materials, the protective barrier shell of hydrated salts serving to isolate physically the alkali sensitive perphthalic acid core from contact with the alkaline material. According to said application, encapsulated products are provided by spraying aqueous droplets of the peracid onto a fluidized bed of finely divided hydratable salt.

One difficulty with this method is that it does not readily provide compositions of as uniform particle size as always may be desirable, nor are the shell thicknesses always of the best uniformity.

For example, in that method droplet size is determinative of the encapsulated particle size. Uniform droplet size is thus important, lest the encapsulated products vary too widely in particle size. It is not easy to control accurately the size of droplets. Screening the encapsulated particles to obtain compositions of more uniform particle size can be used, but the undersize and oversize must be reworked. Reworking necessitates separating the protective shell of salt from the peracid, for example, by dissolving the protective hydrated salt in water. If the salt is to be reused it must be at least partially dehydrated. Dehydration can be costly. In addition, this additional peracid handling increases the opportunity for contamination and other losses. Certain contamination detracts from the peracids stability and may even cause loss of active oxygen.

THE INVENTION

This invention deals with the preparation of compositions of encapsulated particles. It especially concerns the preparation of relatively small particles made up of cores encased in a protective shell of one or more hydrated salts. More particularly, it provides an improved method of preparing encapsulated particles having peracid, notably diperisophthalic acid, cores encased in a protective shell of one or more hydrated or partially hydrated salts.

It has now been discovered that solid particulate compositions of peracids encapsulated in hydrated salts with particle uniformity can be prepared economically and efficiently by solidifying an aqueous normally liquid composition of a peracid (as by freezing the liquid) and contacting this aqueous composition while it is in solid state with a material reactive with water, notably a hydratable salt. Contact is under conditions such as to result in hydration of the hydratable salt, as by establishing the mixture at a temperature at which a hydrated form of the salt is the stable form. Thus, the water (ice) in the frozen peracid composition serves as a source of at least a portion of the water of hydration which ultimately is present in the protective casing of hydrated salt. The product is a solid particulate composition of capsules having a solid core of the peracid encased substantially completely with a solid coating of hydrated salt.

Thus, a key step is the solidifying of a normally liquid mixture of peracid and water into solid state by freezing. In this solid state, solid particles of the aqueous composition are contacted with the hydratable encapsulating material so that the protective shell comprises a coating of hydrated material. Thus, water of the solid aqueous peracid composition reacts with the hydratable material to effect hydration. At least a significant portion of the water of hydration present in the shell of hydrated material is contributed by the ice of the solid mixture of peracid and water.

An important benefit ensuing from the present invention is its capability of providing encapsulated compositions of exceptional uniformity both as to particle size and shell thicknesses. This uniformity is made possible by using solid (frozen) aqueous particles of the peracid which are of substantially uniform size, i.e., sized or otherwise segregated into solid aqueous particles of peracid which vary from particle to particle within a predetermined limit.

As will hereinafter be exemplified by reference to specific embodiments, different expedients may be availed of to regulate the size of the particles. To some extent the choice will depend upon which of several freezing procedures are used in the conversion from liquid into solid state. Regardless of the particulars of solid particle preparation, the particles are thereafter admixed with the material which forms the encapsulated coating, e.g., the hydratable salt.

One appropriate expedient for providing the solid aqueous peracid particles involves subdividing the liquid aqueous organic peracid composition into fine particles, notably droplets, and freezing the subdivided particles. This may be accomplished by way of illustration by feeding the liquid composition of organic peracids through an appropriate spray nozzle or atomizing device to form liquid droplets or like liquid particles. These droplets are then cooled below their freezing point, i.e., are frozen. Thus, liquid droplets may be contacted with inert fluid coolant at a temperature below that at which the liquid particles solidify or freeze.

More specifically, droplets of aqueous diperisophthalic acid slurry of an appropriate size, for example, between from about 0.1 and 3 or 4 millimeters (maximum dimension) are fed into a pool of liquid nitrogen or like fluid coolant at a temperature below $0°$ C. Upon contacting the coolant, the droplets are frozen and transformed into completely solid particles of water (ice) and diperisophthalic acid. Any fluid coolant substantially inert under the temperature and other conditions prevailing during the freezing of the aqueous diperisophthalic acid droplet is of use. Besides liquid nitrogen, liquid hydrocarbons such as propane, n-butane, n-hexane, n-heptane, n-pentane, amylene, halogenated hydrocarbons such as methylene chloride and the freons, magnesium sulfate brine, and the like materials in which the frozen aqueous peracid is insoluble serve. Contact between coolant and liquid for effecting the freezing can be accomplished in any manner. Liquid droplets may be passed through a column cocurrently or countercurrently with respect to liquid coolant. Or, the liquid droplets may simply be dropped into a pool of coolant. Once solidified, the ice particles are separated by recognized expedients.

Gaseous as well as liquid coolants are of use. Droplets of aqueous organic peracid may therefore be passed downwardly through an upwardly rising stream of cold gas, such as cooled carbon dioxide, at a temperature below the freezing point of the slurry, about $0°$ C. or less.

Once prepared, the solid or frozen particles of peracid are then sized to recover a particulate solid composition of the desired particle size range. Undersized and oversized particles from such a screening or sizing operation may simply be liquified, (i.e., raised in temperature) and the resulting liquid recycled to the droplet forming step for refreezing.

Sized frozen particles are then contacted with the material (usually one or more hydratable salt(s)) which in a hydrated form will comprise the composition of the protective encapsulating coating. In these encapsulating steps, the hydratable salt such as magnesium sulfate is in an incompletely hydrated state, preferably even in substantially unhydrated form, so that it is capable of taking up water of the frozen particle as water of hydration. For example, magnesium sulfate per se or magnesium sulfate monohydrate may be the salt, while the protective shell may contain a hydrated magnesium sulfate composition with from 3 to 7 moles of water per mole of magnesium sulfate.

Ideally, the frozen droplets are fed to a bed of fluidized finely divided hydratable salt. Inert gases such as nitrogen are effective fluidizing agents. Thus, a bed of hydratable salt is suspended in a rising stream of inert gas. Bed temperature is conveniently established by controlling the temperature of the fluidizing gas. Solid particles (frozen ice-perphthalic acid droplets) are metered into the bed, usually by feed into the upper portion of the bed.

With the bed temperature above the freezing point of the solid droplets, water available from the ice contents of the droplet appears in the protective shell of the encapsulated particles as water of hydration. The prevailing bed temperature is set to provided for this hydration; i.e., the hydratable salt is one which has one or more higher hydrates stable at the bed temperature. As discussed in U.S. application Ser. No. 602,668, hydrated salts which protect against detonation are those which retain their water of hydration below about 30° C. (so as not to liquify at too cool a temperature) but releases water of hydration below the decomposition temperature of the peracid. When the protective coating is also to protect against detonation, those very hydrated salts are used and their disclosure in said application is expressly incorporated herein by reference.

When the protective coating is not required to serve as protection against detonation, encapsulating coatings of other hydrated materials are certainly of use, and the methods herein described are applicable to them. Coatings even then, should not include water of hydration which is released as liquid water at too low a temperature, e.g., at below 30° C. lest liquid water be inopportunely released. However, the coating materials need not release water of hydration below any particular temperature. Most of the contemplated uses for the peracid of these products anticipates they be dispersed in water. Hence, the hydrated coatings should be water soluble.

Most of the water of hydration found in the ultimate product is usually provided by water of the frozen droplets. Some may be provided by the use of a hydrated, yet further hydratable salt. Also, liquid water may be introduced to augment water supplied from those materials. For example, moisture laden fluidizing gas may add water.

The following examples illustrate the manner in which the present invention may be performed.

EXAMPLE 1

As aqueous slurry of diperisophthalic acid containing 40.6 percent by weight diperisophthalic acid was forced with 25 p.s.i.g. nitrogen gas pressure through a two fluid nozzle directly into a Dewar flask containing a 6-inch deep bath of liquid nitrogen (at minus 195° C.). Frozen droplets thus formed were separated from the liquid nitrogen bath and screened with precooled (to avoid melting) screens to a minus 14 to plus 70 mesh size. While still frozen, the screened droplets were fed to the top of a fluidized bed of finely divided magnesium sulfate monohydrate of a particle size less than 120-mesh size and fluidized in the bed for 30 minutes. Nitrogen gas at ambient temperature was used as the fluidizing gas.

Recovered from the bed was a dry particulate composition with substantially all of its globular particles between about minus 14 and plus 60 mesh, with the predominant number of particles being between minus 14 and plus 20 mesh. The composition contained by weight 23.1 percent diperisophthalic acid, 57.3 percent magnesium sulfate and 19.6 percent water (as water of hydration), the hydrated magnesium sulfate content being concentrated in the particle as a continuous shell surrounding a core which contained substantially all of the particle's diperisophthalic acid content.

The resulting encapsulated products were recovered and screened into three size ranges and tested to determine the rate of active oxygen loss at 60° C.

Table 1 lists the results:

TABLE 1

Rate of Active
Oxygen Loss at 60° C.
% per day

| Mesh Size | Alone | With Bleach Base* |
|---|---|---|
| −14 +20 | 0.46 | 1.02 |
| −20 +35 | 0.49 | 2.68 |
| −35 +60 | 0.1 | 2.07 |
| −14 +60** | 0.90 | 2.22 |

*"Bleach Base" composition:

| | Weight % |
|---|---|
| Sodium Sulfate | 56 |
| Sodium Pyrophosphate | 21 |
| Sodium Carbonate | 13 |
| Sodium Silicate | 6 |
| Synthetic detergent | 4 |
| Perfume | |
| Optical brightener | trace |
| | trace |

**A sample of the unscreened encapsulated product.

EXAMPLE 2

Frozen droplets of aqueous diperisophthalic acid slurry were prepared as in example 1, and screened to a minus 20 to plus 70-mesh size. These frozen cores were then fed to a revolving drum at ambient temperature (about 25° C.) containing minus 120-mesh magnesium sulfate monohydrate. Excess magnesium sulfate was removed by screening and samples of encapsulated products tested.

Table 2 lists the results of tests which determined the rate of active oxygen loss.

TABLE 2

| | Rate of active oxygen loss, percent per day | | | |
|---|---|---|---|---|
| | 32.2° C. | | 55° C. | |
| Mesh size | Alone | With bleach base | Alone | With bleach base |
| −14 +20 | 0.22 | 0.04 | 0.31 | 1.04 |
| −20 +35 | 0.02 | 0.02 | 0.22 | 1.47 |
| −35 +60 | 0.03 | 0.15 | 0.24 | 2.89 |

EXAMPLE 3

Frozen droplets of aqueous diperisophthalic acid slurry were prepared by forcing the slurry through a nozzle (as in example 1) to form droplets which were projected directly into a Dewar flask containing a 6-inch deep pool of liquid hexane at minus 74° C. After separation, the frozen droplets were screened, and the minus 14 to plus 70 mesh fraction was fed to a fluidized bed of magnesium sulfate monohydrate (as in example 1) and kept in the bed for 30 minutes. In this case, the fluidizing nitrogen was warmed to between 25°–35° C.

EXAMPLE 4

Aqueous slurry of diperisophthalic acid containing 40 percent by weight of diperisophthalic acid was forced through a nozzle and sprayed into a Dewar flask containing a 6-inch deep bath of liquid nitrogen (about minus 195° C.) to form frozen droplets of the aqueous slurry. After being separated from the bath, the particles were screened in metal screens to a 14 to plus 70-mesh size and while still frozen, were added to a fluidized bed of magnesium sulfate monohydrate screened to a minus 125-mesh size. The resulting mixture was fluidized for 20 minutes, fluidizing being effected by introducing nitrogen gas heated to 60° C. through a porous aluminum disc at the bottom of the fluidizing reactor.

After the 20 minute treatment, the bed contents were screened; a product of from minus 40 to plus 60-mesh size being separated.

The sized product was then placed in a closed vial and stored in an oven at 60° C., samples being removed and analyzed to determine the active oxygen content from which the average loss of active oxygen per day was calculated. As determined by this procedure, the encapsulated product had an active oxygen loss per day of 0.5 percent when stored alone, and when compounded into a speciality bleach formulation with the following composition, had a loss of active oxygen of 2.8 percent per day.

SPECIALITY BLEACH COMPOSITION

| Component | Weight Percent |
| --- | --- |
| Sodium Sulfate | 26 |
| Magnesium Sulfate | 25 |
| Water of Hydration | 14 |
| Diperisophthalic Acid | 14 |
| Sodium Pyrophosphate | 10 |
| Sodium Carbonate | 6 |
| Sodium Silicate | 3 |
| Sodium Dodecylbenzene Sulfonate | 2 |
| Perfume | trace |
| Optical Brightener | trace |

Examination of the encapsulated products produced in examples 1, 2, 3 and 4 indicate that the products are constituted of spherical or globular particles, the hydrated magnesium sulfate content of which is present as a uniform protective continuous coating around a core containing the particle's diperisophthalic acid content.

In a further embodiment, the aqueous slurry of diperisophthalic acid or like aqueous liquid peracid composition is solidified, e.g., frozen, in a sheet or like nonparticulate form and thereafter physically subdivided, as by pulverization. These granulated or otherwise pulverized particles are then sized, the appropriate size fraction being encapsulated. In this embodiment, the freezing does not depend upon forming droplets of particular particle size. Rather, the liquid aqueous diperisophthalic acid slurry may be frozen in mass, crushed, screened and thereafter encapsulated. Surprisingly, encapsulation appears to minimize particle irregularity.

One specific technique for freezing is to employ a cooling drum or cooling belt. Using such apparatus, the liquid slurry of diperisophthalic acid or like peracid is presented to a moving surface of the drum or belt which surface cools by indirect heating exchange. That is, the face of the surface remote and physically separate from that to which the liquid slurry is presented is in contact with a coolant. Heat is removed from the slurry through the surface to the coolant.

Indirect heat exchange offers other alternatives in the choice of coolant, since it does not contact directly the composition. Concern for reactivity with the diperisophthalic acid or solubility of the acid in the coolant is unnecessary, in this embodiment the coolant being physically separated.

This embodiment also avoids the step of separating frozen aqueous diperisophthalic acid from the coolant, necessary with direct heat exchange in the coolant. Entrainment or contamination due to presence of coolant in or with the frozen product is circumvented.

The following Examples illustrate preparation of encapsulated products utilizing bulk freezing and indirect heat exchange for freezing the aqueous diperisophthalic acid.

EXAMPLE 5

An aqueous slurry of diperisophthalic acid containing 34.5 percent by weight diperisophthalic acid was extruded through a syringe into a liquid nitrogen bath (about minus 195° C.), and the frozen composition separated and ground by hand by mortar and pestle. Screening was used to obtain a composition in the minus 20 to plus 70-mesh range.

Some 81 grams of this screened frozen composition was fed to a four inch diameter glass column containing about 800 grams of minus 120 mesh $MgSO_4 \cdot H_2O$ having a bulk density of 0.69 grams per milliliter while feeding air to the bottom thereof at a velocity of about 1.5 feet per second to fluidize the bed. The average bed temperature was 30° C. and the particles were in the bed for 20 minutes.

The encapsulated products contained by weight 19.9 percent diperisophthalic acid, about 59.8 percent magnesium sulfate and about 20.3 percent water (as water of hydration). The hydrated magnesium sulfate was present primarily as a mixture of magnesium sulfate monohydrate and magnesium sulfate hexahydrate.

Examination of the particles indicated they were relatively smooth and possessed of a uniform capsulating coating of hydrated magnesium sulfate surrounding a core of substantially sulfate free diperisophthalic acid.

EXAMPLE 6

Using an aqueous slurry of diperisophthalic acid containing 38.4 weight percent diperisophthalic acid, the procedure of example 5 was duplicated. Some 45½ grams of the ground frozen aqueous diperisophthalic acid product was fed to the fluidized bed of 665 grams of magnesium sulfate monohydrate. Retention time in this case was 15 minutes and the average bed temperature 25° C. An encapsulated product containing by weight 27.4 percent diperisophthalic acid, 54.8 percent magnesium sulfate and 17.8 percent water as water of hydration was obtained.

EXAMPLE 7

An aqueous slurry of diperisophthalic acid containing 40.3 percent diperisophthalic acid was frozen in the form of thin layers by distributing the slurry on stainless steel sheets. the opposite sides of which were in direct heat exchange with a liquid nitrogen bath. These thin layers were then ground by hand with mortar and pestle.

To a fluidized bed containing about 1,450 grams of magnesium sulfate monohydrate (of the type used in example 5) 241.7 grams of ground frozen aqueous diperisophthalic acid was added over a 5½ minute period. An average bed temperature of 25° C. was maintained and the total time in the bed during which encapsulation was effected was 17 minutes. Encapsulated products were obtained containing a diperisophthalic acid core encased in a hydrated magnesium sulfate protective shell, the capsule composition being by weight 21.1 percent diperisophthalic acid, 54.7 percent magnesium sulfate and 24.2 percent water as water of hydration.

The applicability of the present invention to the encapsulation of organic peracids such as diperisophthalic acid is clearly illustrated by the foregoing examples. In general, any organic peracid may be encapsulated following the principles herein enumerated. However, the method of admirably suited and adapted to the encapsulation of organic peracids of limited solubility in water, e.g., substantially water insoluble, and substantially inert in water. Thus, the process is applied with extreme effectiveness to the encapsulation of aqueous slurries of organic peracids which are frozen.

The common liquid subjected to freezing is water. This is especially the case when the encapsulating coating is a hydrated salt. As described in some detail in application Ser. No. 418,541, filed Dec. 15, 1964, now abandoned, hydrated salts are especially effective in preventing or dampening the detonability of diperisophthalic acid. Hence, the use of an encasing shell of hydrated salt in combination with a diperisophthalic acid core provides for the combination of the protective coating which allows for the blending of the diperisophthalic acid directly with alkaline materials which would otherwise cause it to lose active oxygen as well as provide for protection against detonation or explosion.

In addition, the process is especially applicable when the coating reagent is a hydratable material, notably a hydratable salt. In the course of this coating, water present initially in frozen state (as ice) ends up as water of hydration, hydration of the hydratable material taking place. Thus, a unique combination is effected between the frozen water and hydratable salt. As the foregoing examples illustrate, incompletely hydrated as well as completely hydrated salts can serve as the hydrated coating agent. Ergo the use of magnesium sulfate monohydrate in the examples.

As described in application Ser. No. 418,541, filed Dec. 15, 1964, a wide variety of water soluble substantially inert hydrated salts are effective for providing dampening against detonability. Any of these salts in less than fully hydrated form may be used. In general, the protection against detonability is provided by salts which have water of hydration which is released below the detonation temperature (or temperature range) of the diperisophthalic acid, on the order of about 120° to 130° C. On the other hand, it is also desirable that the salt retain water of hydration at temperatures the composition is apt to encounter in shipping and storage. In colder climates, salts retaining water of hydration below 30° C., but releasing water of hydration above 30° C. and below that at which the peracid decomposes can be used. When warmer climates are apt to prevail, salts which retain water of hydration up to about 60° C. are more appropriate.

As the foregoing illustrates, the invention provides a technique for encapsulating a normally solid material in a protective coating provided by reaction of a solid with a normally liquid reagent which is originally in combination with the material to be encapsulated. Thus, in the specific embodiments herein exemplified, the aqueous slurry of diperisophthalic acid provides water, i.e., the normally liquid reagent for reaction with the hydratable salt. The diperisophthalic acid is the normally solid material which will in the final product be encased by the protective coating provided by the reaction. Magnesium sulfate or like solid, usually in finely divided state, reacts with water to provide an encapsulating coating of solid (nonliquid, nongaseous) reaction product, i.e., a hydrated salt coating in which the water is as water of hydration. One skilled in the art will readily recognize these principles are applicable widely, and not necessarily limited to the particularly exemplary materials expressly detailed.

I claim:

1. A method of encapsulation which comprises freezing a composition containing liquid water and a normally solid component thereby forming a solid composition containing frozen water and the normally solid component, contacting particles of said solidified composition with solid particles of a material reactive with water, reacting said water reactive material with water from the solidified particles and forming solid capsules having a solid core of said normally solid component encased with a solid protective coating of reaction product.

2. The method of claim 1 wherein droplets of the composition containing liquid water and normally solid component are formed and thereafter frozen.

3. The method of claim 2 wherein the frozen droplets are sized prior to contact with the water reactive material.

4. The method of claim 3 wherein the droplets outside the desired size range are liquified and recycled for refreezing.

5. The method of claim 1 wherein the solidified composition is subdivided, and the subdivided solid particles are sized prior to contact with the material reactive with water.

6. The method of claim 5 wherein solid particles outside the desired size are liquified and recycled for refreezing.

7. The method of claim 1 wherein the water reactive material is hydratable salt.

8. An encapsulation method for providing a dry solid composition of small particles which comprises freezing a composition of liquid water and a water insoluble normally solid peracid, contacting particles of the frozen composition with finely divided solid hydratable salt and effecting hydration of the hydratable salt with water from the frozen particles whereby the encapsulate a solid core of the peracid in a coating of hydrated salt.

9. The method of claim 8 wherein the peracid is diperisophthalic acid and the hydratable salt and the coating of hydrated salt are water soluble.

10. The method of claim 8 wherein small droplets of the composition of liquid water and water insoluble normally solid peracid are frozen and thereafter contacted with the hydratable salt at a temperature at which a higher hydrate of the hydratable salt is stable.

11. The method of claim 8 wherein the composition of liquid water and water insoluble normally solid peracid is frozen, the so frozen composition subdivided, the subdivided solid particles sized, and the particles of preselected size so obtained are contacted with hydratable salt.

12. The method of claim 11 wherein the particles other than the preselected size are melted and refrozen.

13. The method of claim 8 wherein the particles are sized prior to contact with hydratable salt with only those particles within the preselected size being then contacted with hydratable salt.

14. The method of claim 13 wherein the particles outside the preselected size are melted and recycled for freezing.

* * * * *